UNITED STATES PATENT OFFICE.

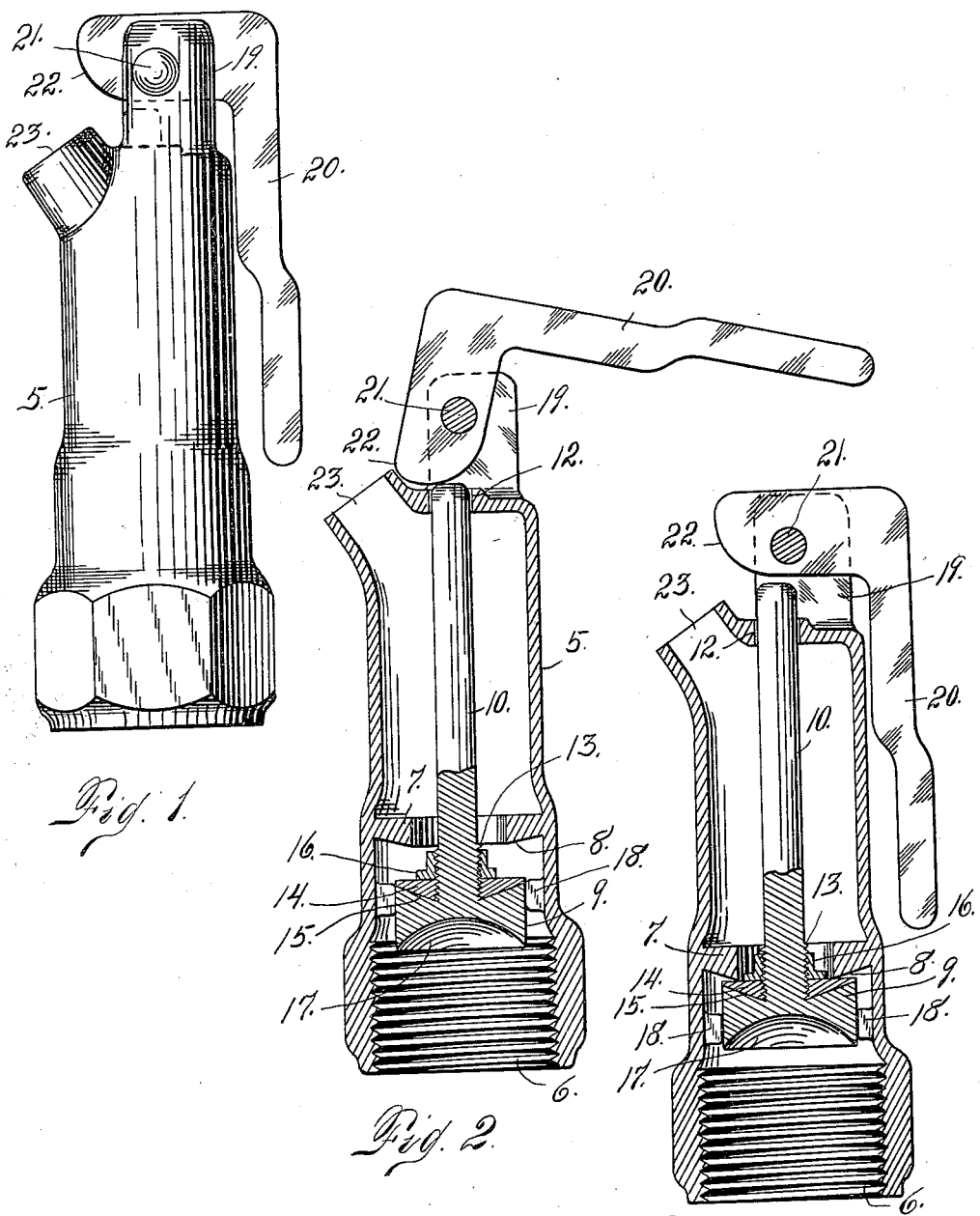

SIDNEY W. SINSHEIMER, OF SWINK, COLORADO.

PRESSURE-VALVE.

1,016,967.  Specification of Letters Patent.  Patented Feb. 13, 1912.

Application filed July 26, 1910. Serial No. 573,869.

*To all whom it may concern:*

Be it known that I, SIDNEY W. SINSHEIMER, a citizen of the United States, residing at Swink, county of Otero, and State of Colorado, have invented certain new and useful Improvements in Pressure-Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in pressure valves.

The object of the invention is to provide a valve, simple and economical in construction, parts of which are readily accessible for replacement or repair.

The invention consists of a casing, having an interiorly threaded extremity, whereby the same may be applied to a hose or conduit. Within this casing is located the valve proper, having a stem which protrudes coaxially through the casing and which is acted upon by the cam lever pivoted on the outside of the casing.

Having briefly outlined my improved construction, I will proceed to describe the same in detail, reference being made to the accompanying drawing in which is illustrated an embodiment thereof.

In this drawing: Figure 1 is a side elevation of my improved valve. Fig. 2 is a longitudinal sectional view showing the valve open. Fig. 3 is a longitudinal sectional view showing the valve closed.

The same reference characters indicate the same parts in all the views.

Let the numeral 5 designate a casing having an interiorly threaded extremity 6 and an interior, circumferential flange 7. A portion of the circumferential flange tapers forwardly toward the casing as shown at 8. This circumferential flange 7 forms the seat for the valve 9. The valve 9 is provided with a stem 10, which passes coaxially through the casing and protrudes through an opening 12 in the forward extremity thereof. The portion of the stem 10, near the valve 9 is provided with a threaded portion 13, on which is threaded a gasket 14.

The gasket 14 is formed larger at the portion near the stem, and gradually decreases in size as it extends outwardly. The larger portion of the gasket fits within an inwardly tapering recess 15 of the valve 9. Upon the threaded portion of the stem beyond the gasket is threaded a lock nut 16 which firmly holds the gasket within the concavity and against the valve 9.

The gasket 14 may be constructed of any suitable material, such as leather, rubber, or Babbitt metal, but in this particular case I find it preferable to use a metal gasket.

The side of the valve 9, which is acted upon by the pressure to maintain the same in the closed position, is provided with a concave recess 17, which deflects the liquid or fluid to a central point of the valve.

The sides of the casing inwardly and beyond the circumferential flange or valve seat 7 are provided with interiorly projecting guide members 18 which engage the sides of the valve, thus preventing a lateral movement of the same.

The forward extremity of the casing 5 is provided with a bifurcated extension 19 within which is pivoted a lever 20, as shown at 21, and having a cam member 22 arranged to act upon the extremity of the stem 10, for opening the valve against the pressure.

From the foregoing description, the construction and operation of my improved valve will be readily understood.

The parts are first assembled within the casing and the threaded portion 6 of the casing is connected with a hose or conduit, whereby the pressure acts upon the valve 9 to hold the same against the seat 8, thus preventing the escape of the fluid. When it is desired to open the valve the lever 20 is moved forwardly, whereby the cam 22 acts upon the extremity of the stem 10, thus pressing the valve away from the seat 8, and allowing the liquid to escape between the valve 9 and the inner wall of the casing 5, and thence discharged through a discharge-opening 23 in the forward extremity of the casing.

My improved valve as set forth herein has no packing or stem under pressure when closed; while its closing operation cannot be interfered with by the operator. Hence the pressure on the valve when closed is uniform, being due to that of the liquid only.

Having thus described my invention, what I claim is:

1. A device of the class described, comprising a casing, a valve piece located within the casing, a valve stem protruding coaxially through the casing, the said valve stem having a threaded portion beyond the valve piece, the forward side of the valve piece having a recess surrounding the threaded portion of the stem and tapering inwardly to the said stem, a gasket of counterpart shape threaded on the valve stem and adapted to fit within the said recess, and a locking nut arranged to engage the gasket, the casing being provided with a circumferential flange forming a valve seat and located forward of the valve piece, the inner side of the valve piece being concave, the concave surface of the valve piece being adapted to be acted upon by forward pressure for maintaining the forward side of the valve piece in engagement with the circumferential flange, and exteriorly located means adapted to act upon the protruding portion of the valve stem for opening the valve against forward pressure, substantially as described.

2. A device of the class described, comprising a casing, a valve piece located within the casing, a valve stem protruding through the casing, the said valve stem having a threaded portion beyond the valve piece, the forward side of the valve piece having a recess surrounding the threaded portion of the stem and tapering inwardly to the said stem, a gasket of counterpart shape threaded on the valve stem and adapted to fit within the said recess, and a locking nut arranged to engage the gasket, the casing being provided with a circumferential flange tapering forwardly on its inner side from the inner periphery thereof, the said flange being arranged forward of the valve piece and forming a valve seat, the valve piece being arranged to be acted upon by forward pressure for maintaining the valve piece in engagement with the seat, substantially as described.

3. A device of the class described, comprising a casing, a valve piece located within the casing, a valve stem protruding forwardly through the casing, the forward side of the valve piece having a recess surrounding the stem and tapering inwardly to the said stem, a gasket of counterpart shape surrounding the valve stem and arranged within the said recess, the casing being provided with a circumferential flange tapering forwardly on its inner side from the inner periphery thereof, the said flange being arranged forward of the valve piece for forming a valve seat, the valve piece being arranged to be acted upon by forward pressure for maintaining the gasket of the valve piece in engagement with the seat, substantially as described.

In testimony whereof I affix my signature in presence of two witnesses.

SIDNEY W. SINSHEIMER.

Witnesses:
F. E. BOWEN,
HORTENSE UHLRICH.

Copies of this patent may be obtained for five cents each, by addressing the "Commissioner of Patents, Washington, D. C."